July 30, 1957     A. J. DI STIO ET AL     2,801,378
ELECTRICAL POWER CONTROL SYSTEM FOR JET ENGINE STARTING
Filed Oct. 25, 1956
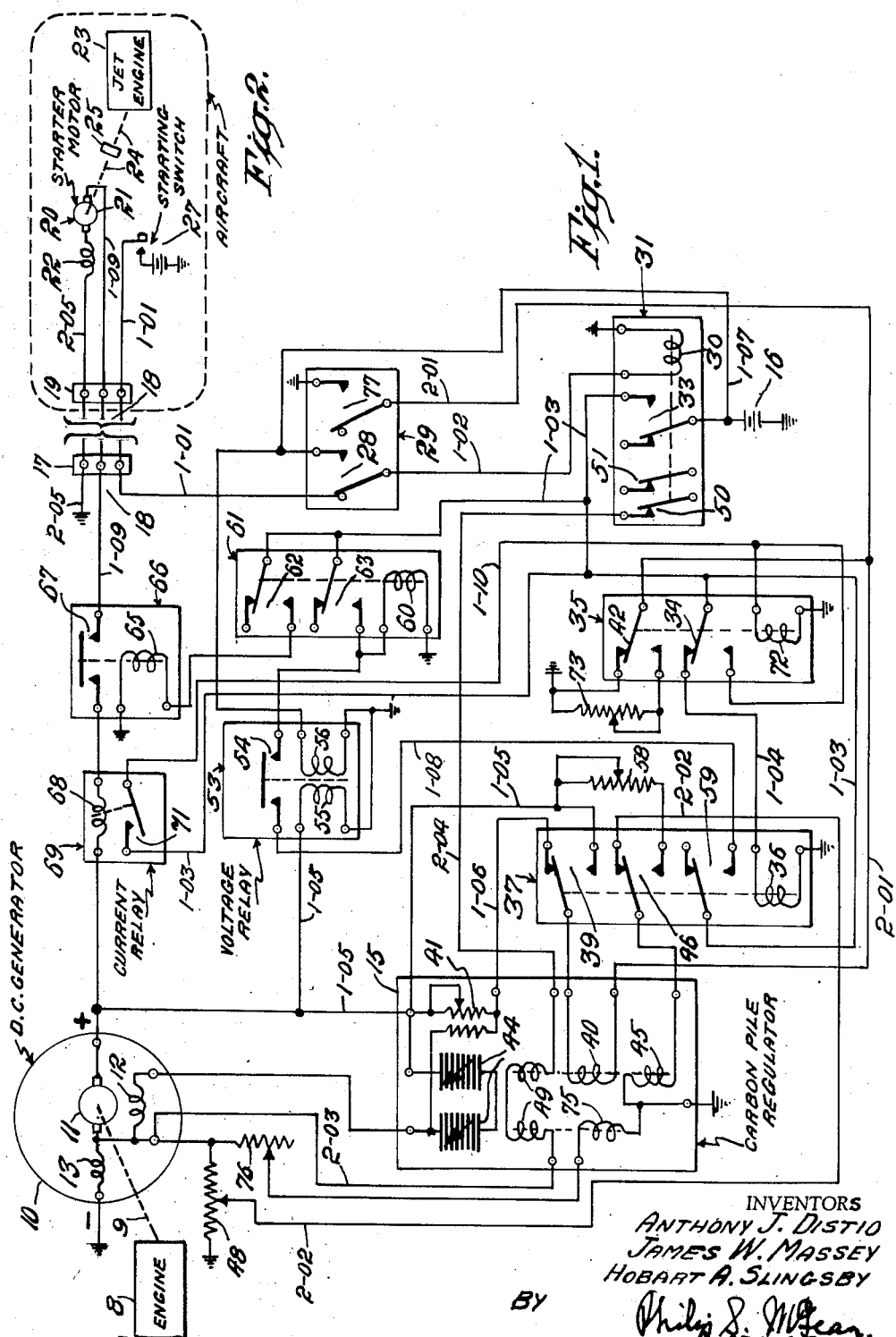
INVENTORS
*Anthony J. Distio*
*James W. Massey*
*Hobart A. Slingsby*
BY
*Philip S. McLean*
ATTORNEY

2,801,378

United States Patent Office

Patented July 30, 1957

2,801,378

ELECTRICAL POWER CONTROL SYSTEM FOR JET ENGINE STARTING

Anthony J. Di Stio, James W. Massey, and Hobart A. Slingsby, Wichita, Kans., assignors to Beech Aircraft Corporation, Wichita, Kans., a corporation of Delaware Application October 25, 1956, Serial No. 618,390

7 Claims. (Cl. 318—144)

The present invention relates to electrical control apparatus for supplying a regulated current to the starter motor of an aircraft jet engine.

The control apparatus of the present invention supplies starting current to the starter motor of the aircraft, the current being so regulated that excessive starting torque is avoided and the jet engine which is being started is brought up to speed with controlled acceleration and is given a sufficient run at high speed with overvoltage applied to the starter motor to assure a jet start. Such starting by means of a regulated starting current is commonly referred to as a "soft" start.

Regulated starting current for this purpose has heretofore been obtained by means of specially constructed generators and complex control equipment. Such special generators and control equipment are costly and are not readily available. The present invention makes use of relatively inexpensive standard generators and standard regulators together with voltage and current sensitive relays and control relays for providing the desired regulation of the starting current.

Advantageously, the control apparatus of the present invention may be included in a self-propelled mobile power unit which is moved about an airfield for use as required. The mobile power unit usually contains its own independent gasoline engine, a storage battery and two generators. A gasoline engine drives each generator. One of the generators is used for charging the storage battery and for supplying support power at constant voltage to the electrical system of the aircraft while the aircraft stands on the airfield with its engines shut down. The other or starting generator is used for supplying a regulated starting current to the starter motor which starts the aircraft engines. The starting generator, when not in use for starting purposes, may be tied in with the support generator so that the support load is divided between the two generators.

Various additional objects, features and advantages of the invention will become apparent upon reading the following specification together with the accompanying drawing forming a part thereof.

Referring to the drawing:

Fig. 1 is an electrical circuit diagram of that portion of a mobile ground power unit which is used for supplying starting current to the starter motor of an aircraft jet engine, the other portions such as the support power and propulsion circuits being omitted for simplicity of illustration.

Fig. 2 is an electrical circuit diagram showing the aircraft starter motor and a starting control switch, Fig. 2 being connected with Fig. 1 by a flexible cable.

Referring to Fig. 1, an internal combustion engine such as a gasoline engine 8 is connected by means of a suitable mechanical coupling 9 to drive a direct current generator designated generally as 10. The generator 10 is of the compound wound type and comprises an armature 11 which is connected by the mechanical coupling 9 with the internal combustion engine 8. The generator 10 also comprises a shunt field 12 and a series field 13.

There is a carbon pile regulator designated generally as 15 which controls the voltage of generator 10 in a manner later to be described. Power for operation of the various control relays is supplied by a battery 16. There is also a starting circuit connector 17 which is connected by a three-wire flexible cable 18 with a further connector 19 mounted on an aicraft (not shown in detail). The aircraft comprises a starter motor designated generally as 20 which has an armature 21 and a series field 22. A jet engine 23 is mechanically connected to be driven by the armature 21 of starter motor 20 by means of a mechanical coupling 24 including a one-way clutch 25 or similar device to prevent the jet engine 23 from driving the starter motor 20.

The aircraft includes a manually operable starting switch 27. When operated, the switch 27 energizes a conductor 1-01 which extends through the cable 18 to the normally closed contacts 28 of a manually operable two-pole emergency starting switch 29. This circuit extends from contacts 28 over a further conductor 1-02 to the operating winding 30 of a starting control relay 31.

The starting control relay 31 is provided with a set of normally open contacts 33. When relay 31 is operated, a conductor 1-03 is energized by contacts 33 from the battery 16. The conductor 1-03 is connected through a set of normally closed contacts 34 of a high voltage relay 35 and a conductor 1-04 to the operating winding 36 of a low voltage relay 37.

The low voltage relay 37 is a three-pole relay. One of the poles includes a set of single pole double throw contacts 39. Normally, the contacts 39 connect a voltage regulating or control winding 40 of the carbon pile regulator 15 to a generator output conductor 1-06 through an adjustable resistor 41 mounted in the regulator. The circuit of regulator winding 40 is completed to ground through a conductor 2-01 and normally closed contacts of pole 42 of the high voltage relay 35.

The voltage regulator 15 comprises two serially connected carbon piles 44 which are included in the energizing circuit for the shunt field 12 of generator 10. Increased current flow in regulating winding 40 decreases the mechanical pressure on the carbon piles 44. The decreased pressure increases the electrical resistance of the carbon piles 44 whereby the current flow in the shunt field winding 12 is reduced. The reduced current flow through shunt field winding 12, in turn reduces the output voltage of generator 10 thereby tending to maintain a constant voltage on the generator output conductor 1-05. For purposes of illustration, let it be assumed that the voltage on conductor 1-05 is normally 28 volts with the low voltage relay 37 released.

With the low voltage relay 37 released, a voltage boosting coil 45 of regulator 15 is connected through the normally closed contacts 46 of a pole of relay 37 and through a conductor 2-02 to an adjustable potentiometer 48. The potentiometer 48 is connected in multiple with the series field winding 13 and consequently provides a manually adjustable voltage on conductor 2-02 which is negative with respect to ground and which increases with increasing load on the generator 10. This negative potential is applied to the voltage boosting coil 45 of regulator 15 to oppose the action of the voltage regulating coil 40 and increase the regulated output voltage of generator 15 with increasing generator load in order to compensate for increasing voltage drop in the wiring system with increased load.

The starting generator 10 may be tied in with the support generator (not shown) to share the support load, except when the starting generator is actually being used for starting. This tie-in may be effected by conventional means including reverse current relays, etc. to prevent undesirable interaction between the two generators when the starting generator voltage is varied during the starting period. At all other times, the two generators may be operated in parallel to supply a common support power bus and to charge the battery 16. The support generator may be provided with a regulator similar to the regulator 15. The regulators are desirably provided with equalizing windings 49 which assist in a proper division of the load between the two generators. The equalizing windings 49 are connected by a conductor 2-03 to the ungrounded side of the series field 13. The equalizing windings 49 are further connected via a conductor 2-04 and through normally closed contacts 50 of the starting control relay 31 and through the equalizing windings (not shown) of the other regulator. The equalizing circuit terminates at the ungrounded series field terminal of the other generator as shown for generator 10. The magnitude and direction of current flow in the equalizing circuit will thus depend upon the voltage difference between the ungrounded sides of the series fields of two generators. This equalizing current will tend to boost the voltage of the generator with lesser current in its series field winding, thus to equalize the respective loads carried by the two generators.

The starting control relay 31 also comprises a set of normally closed contacts 51 which control the reverse current relay in the tie-in circuit between the two generators so that during starting, the support generators may maintain constant voltage while the voltage of the starting generator is reduced and raised as described below. Because the circuit arrangements for the operation of two generators in parallel are well known in the art, the details of the interconnections have been omitted for simplicity of illustration. Enough has been shown, however, to demonstrate how the two generators are rendered independent of each other during operation of the starting generator 10 for starting purposes while leaving it arranged for operation in multiple with the support generator when it is not actually being used for starting.

There is a voltage sensing relay 53. The voltage relay 53 is provided with a set of normally open contacts 54 and with two windings 55 and 56. The winding 56 is continuously energized at substantially constant voltage from the battery 16 via a conductor 1-07 and serves as a biasing winding. The other winding 55 is a voltage sensing winding and is connected to the generator output conductor 1-05 for response to the output voltage of the generator 10. With both windings 55 and 56 energized at the same voltage, about 28 volts in the present example, contacts 54 remain open. When the voltage on conductor 1-05 drops to about 6.0 volts, however, the contacts 54 will close.

When the starting control relay 31 is operated by the starting switch 27 (Fig. 2), the contacts 50 and 51 open rendering the starting generator 10 independent of the support generator, as described above. Contacts 33 close, thereby energizing conductors 1-03, 1-04 and the winding 36 of the low voltage relay 37. Contacts 39 of low voltage relay 37 are then actuated to transfer the voltage regulating winding 40 of regulator 15 from its normal connection through the resistor 41 to a direct connection to generator output conductor 1-05. This effects a reduction in mechanical pressure on the carbon piles 44 such that the output voltage of generator 10 drops to about 7.5 volts. At the same time, the contacts 46 of low voltage relay 37 operate to transfer the voltage boosting winding 45 of regulator 15 from the voltage boost conductor 2-02 which is at a negative potential to a low voltage adjusting resistor 58. The resistor 58 is connected to the generator output conductor 1-05 which is at positive potential. The operation of contacts 46 thus reverses the polarity and the normal boosting action of regulator winding 45 and causes it to further decrease the voltage of generator 10 to a value of about 6.0 volts. The relay 37 also closes a set of normally open contacts 59 which connect conductor 1-03 to energize a conductor 1-08. The conductor 1-08 extends to the contacts 54 of the voltage sensing relay 53.

After the generator 10 has responded to the operation of low voltage relay 37 and its terminal voltage has dropped to 6.0 volts, the voltage sensing relay 53 closes its contacts 54 and energizes the operating winding 60 of a contactor control relay 61. The contactor control relay 61 thereupon closes two independent sets of normally open contacts 62 and 63.

The contacts 63 establish a locking or holding circuit for relay 61 directly from the contacts 33 of starting control relay 31 via the conductor 1-03. This maintains the contactor control relay 61 operated independently of contacts 54 of the voltage sensing relay 53 and contacts 59 of the low voltage relay 37. Accordingly, the contactor control relay 61 will be held operated until the starting control relay 31 is released.

Closure of the contacts 62 of contactor control relay 61 energizes the operating winding 65 of a contactor 66. Contactor 66 thereupon closes its normally open contacts 67.

Closure of the contacts 67 establishes an energizing circuit for the starter motor 20 from the generator output conductor 1-05 and through a low resistance winding 68 of a current sensing relay 69 to a further conductor 1-09. The conductor 1-09 extends to the armature 21 of starter motor 20 through connectors 17 and 19 and the flexible cable 18. The energizing circuit is completed through the series field 22 of motor 20 and a ground conductor 2-05, the ground conductor 2-05 extending through the connectors 17 and 19 and the interconnecting cable 18.

A voltage of 6.0 volts is thus applied to the starter motor 20 which immediately begins to draw current. When this current has increased to a value of 135 amperes, for example, the current sensing relay 69 closes a set of normally open contacts 71. Closure of contacts 71 energizes a conductor 1-10 and the operating winding 72 of high voltage relay 35, referred to above. This operates the set of contacts 42 whereby the voltage regulating winding 40 of regulator 15 is no longer returned directly to ground but is connected to ground through a high voltage adjusting resistor 73. The set of contacts 34 are also operated to deenergize the operating winding 36 of low voltage relay 37 and to establish a locking circuit for winding 72 of high voltage relay 35 directly from conductor 1-03 and contacts 33 of starting control relay 31 independently of the contacts 71 of the current sensing relay 69.

The low voltage relay 37 releases and restores the normal voltage resistor 41 into the circuit of regulator winding 40. The voltage boosting winding 45 of regulator 15 is also restored to its normal voltage boosting circuit. The generator voltage then rises to a value determined by the additional resistance of the high voltage resistor 73 which is introduced into the circuit of the voltage regulating coil 40. In the example illustrated, this voltage is assumed to be 35 volts and the regulator will tend to regulate around this value.

However, the increasing generator voltage might produce excessive current in the starter motor 20 which would cause undue torque and damage to the aircraft. To avoid excessive current, the regulator 15 is provided with a current limiting winding 75 which is connected to the ungrounded side of the generator series field winding 13 through an adjustable resistor 76. The current limiting winding 75 acts to hold down the generator voltage so that the maximum current supplied to the starter motor 20 will not exceed a value of 1,000 amperes, this being a maximum safe value for the illustrative example herein disclosed.

With the maximum current thus limited to 1,000 amperes, the voltage of generator 10 will rise to 35 volts which assures a high speed for the series starting motor 20 and an appropriately regulated starting run for the jet engine 23. Accordingly, the jet engine 23 may be brought to a condition for a proper jet start but without applying any unsafe starting torque at any time during the starting procedure. When it is determined that the jet engine 23 is properly started, the starting switch 27 is opened. This releases the starting control relay 31 and unlocks the high voltage relay 35 and the contactor control relay 61. This shuts off starting power for the motor 20 and restores all of the relays to their initial conditions in preparation for another starting operation. At the same time, the generator 10 is reconnected for operation in multiple with the support generator.

If the aircraft is not provided with a starting switch 27 or if for some reason the switch is inoperative, the conductor 1–01 may be energized by operation of the emergency starting switch 29. Starting control relay 31 is energized and the starting procedure takes place as described above. However, the emergency starting switch is provided with a set of contacts 77 which maintains the conductor 2–01 at ground potential so that the high voltage adjusting resistor 73 is not included in series with regulator winding 40. As a result, when using the emergency starting switch 77, the maximum voltage is limited to 28 volts instead of 35 volts as when using the starting switch 27.

We have shown what we believe to be the best embodiments of our invention. It will be apparent to those skilled in the art, however, that many changes and modifications may be made therein without departing from the spirit and scope of the invention as defined in the appended claims.

What is claimed is:

1. Engine starting apparatus of the class described, comprising in combination: a power driven generator, said generator comprising means for regulating the output voltage thereof; an energizing circuit connected to said generator, said energizing circuit being adapted for connection to a starting motor; starting control means for initiating operation of said starting apparatus to supply starting current from said generator to said energizing circuit; means responsive to said starting control means for bringing said output voltage to a predetermined low value; current responsive means included in said energizing circuit and operative at said predetermined low value of output voltage to increase the output voltage of said generator when said starting current at said low voltage attains a predetermined maximum value; and means included in said energizing circuit for limiting the maximum current therein when said voltage of said generator is increased.

2. Engine starting apparatus of the class described, comprising: a direct current generator, said generator including a field winding; an energizing circuit connected to said generator, said energizing circuit being adapted for connection to a starter motor for starting said engine; starting control means for initiating operation of said apparatus to supply starting current from said generator to said energizing circuit; regulator means connected to said energizing circuit and to said field winding for regulating the voltage delivered by said generator to said energizing circuit; means responsive to said starting control means for causing said regulator means to act on said field winding to supply predetermined reduced voltage from said generator to said energizing circuit; current responsive means included in said energizing circuit and responsive to a predetermined low maximum current therein at said low voltage; means actuated by said current responsive means for causing said regulator means to act on said field winding to increase said generator voltage to a predetermined high maximum value; and current limiting means included in said regulator means and connected in said energizing circuit for limiting the maximum current delivered by said generator to said energizing circuit.

3. Engine starting apparatus of the class described, comprising in combination: a direct current generator including a shunt field winding, an output circuit connected to receive the output of said generator, said output circuit being adapted for connection to a starter motor for starting said engine; a first circuit control means for selectively opening and closing said output circuit; starting control means for initiating operation of said apparatus to supply starting current to said starter motor; a regulator connected to supply a controlled current to said shunt field; means connecting said regulator to said starting control means for causing said generator to apply a predetermined low initial voltage to said output circuit upon operation of said starting control means; voltage responsive means connected to said output circuit and responsive to said initial voltage and connected to said first circuit control means for closing said output circuit in response to said initial voltage; current responsive means included in said output circuit and connected to said regulator, said current responsive means being responsive to a low initial current in said output circuit and being connected to cause said regulator to supply an increased current to said shunt field winding for increasing the voltage in said output circuit to a predetermined maximum value higher than said initial voltage; and current limiting means included in said regulator and connected to said output circuit for limiting the maximum current flow in said output circuit to a predetermined high maximum value by holding said output circuit voltage below said predetermined maximum voltage until said starter motor has accelerated to a speed where is operates at said predetermined maximum voltage without drawing a current from said output circuit exceeding said high maximum value.

4. Engine starting apparatus of the class described, comprising in combination: a direct current generator including an armature and respective shunt and series fields; a voltage regulator including first and second control windings and a variable resistance element of resistance controlled by said control windings, said variable resistance element being connected to supply a regulated current to said shunt field; means connecting said first control winding to said armature to vary said variable resistance element for maintaining a substantially constant normal output voltage for said generator; means connecting said second control winding with said series field for boosting said constant output voltage with increasing load on said generator; an output circuit for said generator connected to said armature and to said series field winding, said output circuit being adapted to energize a starter motor for starting said engine; a contactor included in said output circuit for selectively connecting said generator to and disconnecting said generator from said starter motor; starting control means for controlling said contactor to initiate starting of said engine; means controlled by said starting control means and connected to said first control winding for applying an increased voltage from said armature thereto whereby the output voltage of said generator is reduced, said last-named means including means for reversing the action of said second control winding to further reduce the output voltage of said generator; voltage responsive means connected to said output circuit and responsive to reduction of said generator voltage from said normal value to said reduced value for causing said contactor to connect said generator to said starter; means responsive to actuation of said contactor for reducing the current supplied to said first control winding for raising the output voltage of said generator to a predetermined maximum value higher than said normal value; and a current limiting control winding included in said regulator, said limiting winding being arranged to act on said variable resistance element to hold down the output voltage of said generator below said maximum value for limiting the current flow in said output circuit to a predetermined maximum value.

5. Apparatus according to claim 4, further comprising a current responsive relay included in said output circuit, said current responsive relay being actuated in response to a predetermined low value of current flow in said output circuit less than said maximum value, said control relay being included in said means responsive to said actuation of said contactor.

6. Apparatus according to claim 4, wherein said generator, when operating at said normal voltage, is adapted for operation in multiple with a further generator, and in which said regulator further comprises equalizing windings for distributing a common load between said two generators, said starting control means further comprising circuit means for disabling said equalizing windings and causing discontinuance of said multiple operation upon actuation of said starting control means.

7. Control apparatus according to claim 4, in which said variable resistance element is a carbon pile.

References Cited in the file of this patent
UNITED STATES PATENTS
2,592,522    Hendrick _____ Apr. 8, 1952